Figure 1:
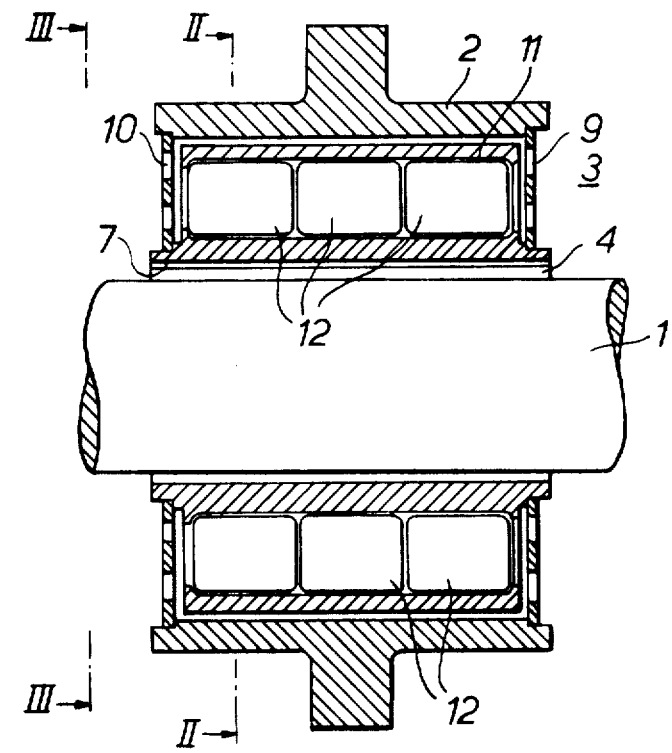

United States Patent

Sixsmith

[15] 3,639,014
[45] Feb. 1, 1972

[54] DAMPED BEARING

[72] Inventor: Herbert Sixsmith, Oxford, England

[73] Assignee: National Research Development Corporation, London, England

[22] Filed: Mar. 24, 1969

[21] Appl. No.: 809,774

[30] Foreign Application Priority Data

Mar. 26, 1968 Great Britain...............14,555/68

[52] U.S. Cl. ...............................................308/9
[51] Int. Cl. ........................................F16c 17/16
[58] Field of Search ...........................308/1, 9, 184

[56] References Cited

UNITED STATES PATENTS 3,351,394 11/1967 Hooker.................................308/9

Primary Examiner—Fred C. Mattern, Jr.
Assistant Examiner—Frank Susko
Attorney—Cushman, Darby & Cushman

[57] ABSTRACT

A bearing assembly, in which the bearing is located between the fixed and rotatable members in such a manner that it can adjust to a certain extent to radial movement of the movable member, is damped against vibration or shock by housing a seismic mass in the bearing with limited freedom of radial movement.

10 Claims, 5 Drawing Figures

DAMPED BEARING

This invention relates to a damped bearing, particularly but not exclusively a gas bearing. Gas bearings employing pads with a *thin gas film* between the bearing pad and a relatively rotating part are known. One such bearing to which this invention has particular, but not exclusive, application is known as an inclined pad bearing. In this bearing the pads are arranged in a cylindrical fashion around a shaft but the pad surfaces are inclined towards the shaft surface i.e., each pad is arranged so that its radial distance from the shaft decreases in a circumferential direction around the shaft in the direction of rotation. This means, of course, that one end of each pad is nearer to the shaft than the other.

The rotation of the shaft carries gas by viscous drag into the converging gap between the shaft and the pad. The gas film in the gap is thereby compressed and in a stable bearing the resulting pressure should support the shaft in a position of equilibrium. If the shaft is displaced and released the center of the shaft will describe an orbit about its former position of equilibrium. This orbital motion is known as whirl.

If the bearing is stable the orbit will be a spiral which contracts towards the position of equilibrium. If, however, the bearing should happen to be unstable the orbit will be a spiral which expands until the shaft touches the pad, at which instant the resulting dry friction may cause the destruction of the bearing.

Another form of bearing to which the present invention has application is known as a tilting pad bearing. This form of bearing is, in more general terms, an inclined pad bearing having separate pads which are pivotally or resiliently mounted and urged towards the desired inclined pad disposition. As with the inclined pad bearing discussed above, a compressed gas film is induced between the pads and shaft which tends to support the shaft in a position of equilibrium; and there is added advantage in the fact that the pads can tilt away from and towards their normal position with increase and decrease of the adjacent gas film pressure as the film thickness is modulated by shaft vibration. However, under certain conditions, particularly at high shaft speeds, the pads have a tendency to oscillate and this, in turn, causes the shaft to oscillate. The resulting vibration may not be acceptable in some circumstances.

An object of the present invention is to provide a bearing which is capable of damping whirl and like vibration such as discussed above, and which is substantially insensitive to externally applied shocks and vibration.

To this end the invention provides a damped bearing assembly comprising a bearing for supporting a rotatable member relative to a fixed member, the bearing being located between said members in such a manner that it can adjust, to a certain extent, to movement of the rotatable member in a direction radially of the axis of rotation thereof, and the bearing housing a seismic mass with limited freedom of movement radially of said axis. In practice the limited freedom of movement is provided by a thin film of fluid which couples the mass with the bearing, this film being sufficiently thin that vibration of the bearing with respect to the mass causes the fluid on the opposite sides of a plane through the axis of the bearing to be respectively compressed and expanded, and the resultant fluid leakage flow provides damping of the vibration.

Preferably the seismic mass is in the form of a number of component masses in the form of cylindrical rollers located in cylindrical bores parallel to the axis of rotation in the body of the bearing and spaced from the bores by a small radial clearance which may be of the order of 0.0001–0.0025 inch. These rollers should be spaced uniformly around the bearing, and they may be ordinary roller bearings of steel or other high-density material.

In the case of a gas bearing assembly where the bearing is spaced from one of said members by a gas film, the bearing is preferably resiliently supported, such as by radially resilient spring means at its axial ends, relative to the other member. Also, in large bearings, the mass may be similarly resiliently supported relative to the bearing.

Figure 3:
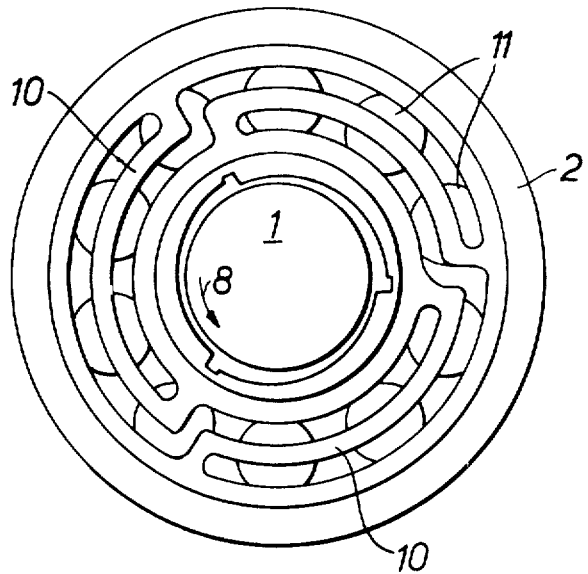
Figure 2:
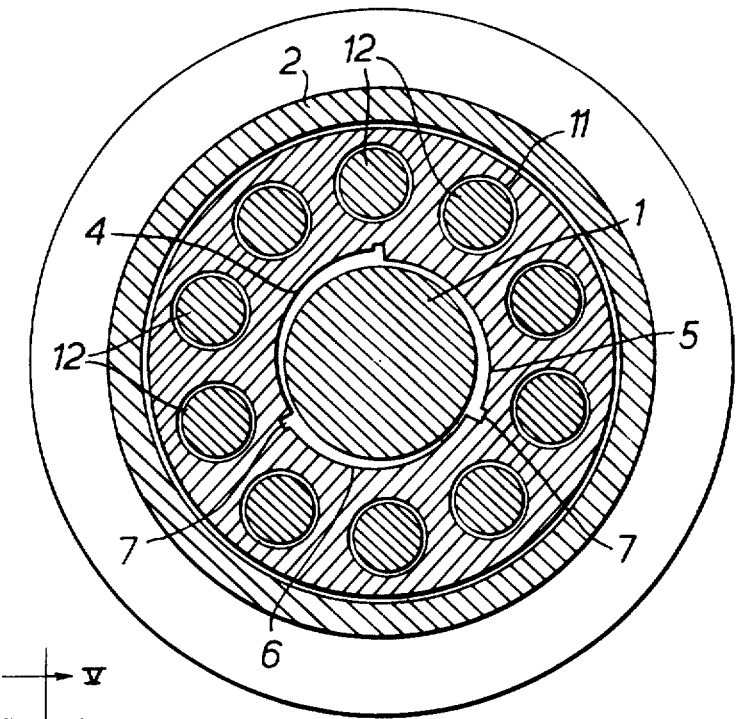
Figure 4:
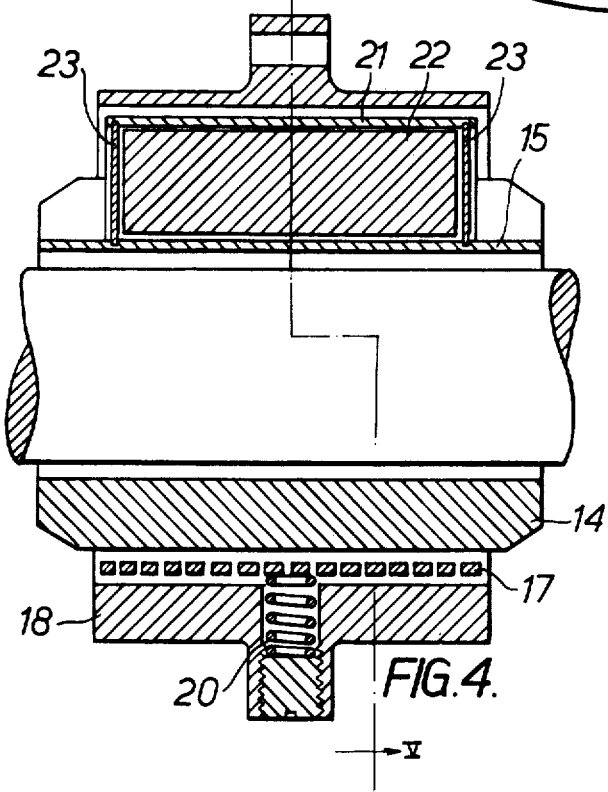
Figure 5:
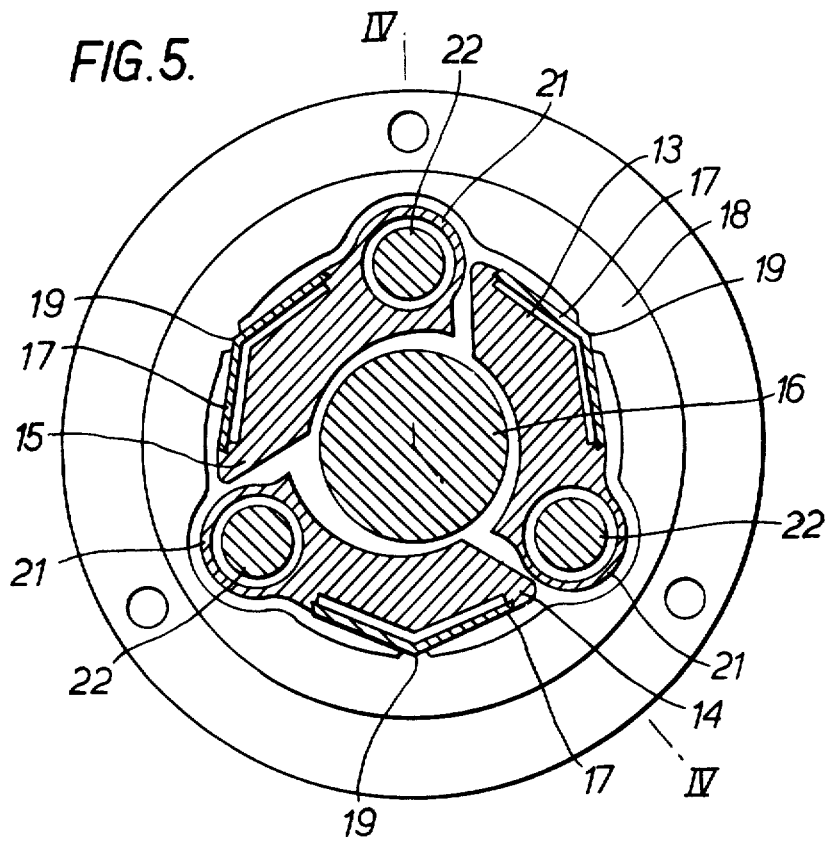

For a clearer understanding of the present invention, the same will now be described by way of example with reference to the accompanying drawings, in which:

FIG. 1 is a longitudinal section through a shaft supported by one embodiment of a bearing according to the invention, FIG. 2 is a section on line II—II of FIG. 1, FIG. 3 is a section on line III—III of FIG. 1, FIG. 4 is a similar view to that of FIG. 2 for another bearing embodiment, and FIG. 5 is a section on line V—V of FIG. 4.

In FIGS. 1 to 3 is shown a shaft 1 rotatably supported from a fixed member 2 by a gas bearing 3.

The bearing consists of three arcuate pads 4, 5 and 6 linked together in substantially cylindrical shape. Between each of the arcuate pads and its neighbor is a slot 7 to allow gas to flow into the bearing axially. It will be seen that the pads are "inclined," that is to say the distance of each pad from the shaft decreases in the circumferential direction indicated by the arrow 8.

The pad assembly is separated from the fixed member 2 by radial springs 9 and 10. There are axial bores 11 around the pad assembly in which are located cylindrical steel rollers 12, the spacing between the rollers 12 and the walls of the bores 11 being of the order 0.0005–0.0015 inch.

In the normal operation of the bearing the shaft is supported in a position of equilibrium. If the shaft is given a sudden shock causing it to whirl, the cyclic variation in the thickness of the gas film between the pads and the shaft will generate a corresponding cyclic variation in the pressure and the force acting on the pad assembly, which will cause the pad assembly to whirl. The whirling of the pad assembly will cause at any point around the circumference a cyclic variation in the radial dimensions of the films between the seismic masses and the pad assembly. The cyclic compression and expansion of each of the last-mentioned gas films will cause a circumferential and axial flow of gas and the associated viscous resistance to such flow will absorb a substantial portion of the work of compression and expansion of the gas film. Thus the squeeze film action between the seismic masses and the pad assembly is capable of absorbing the energy transmitted to the pad assembly by variations in the pressure between the pads and the shaft. To ensure stability the rate of energy absorption should be greater than the rate of transmission.

To further clarify the action of the seismic masses, consider the shaft to be in a horizontal disposition with the masses resting in contact with the walls of their respective bores for zero amplitude of whirl. Damping along a vertical axis should theoretically be zero and ineffective, but the masses are free to roll in a horizontal direction to produce effective damping in this direction down to zero amplitude of whirl. In practice, the radial direction of any oscillation of the pad assembly, resulting from radial movement of the shaft, rotates and so passes through a horizontal disposition in which it is attenuated. In fact the masses can lift off from contact with their bores so that the bearing becomes free to move with respect to the masses, and this can be witnessed by rotation of the masses in some circumstances.

In any event use of the invention as just described in such that a pad assembly which would otherwise be unstable against whirl if mounted on a rigid support can be stabilized against whirl.

The spring support of the bearing has the further advantage in that it provides a measure of protection against externally applied shocks and vibration.

Instead of the radial springs shown an O-ring type of suspension could be used. In place of the separate rollers 12 an annular mass could be employed and it could be arranged in an annular slot in place of the bores 11.

The required surfaces for the pads 4, 5 and 6 could be produced by blending three local radii and curvature produced by separate honing operations.

Turning to FIGS. 4 and 5, these show application of the invention to a tilting pad bearing comprising a group of three pads 13, 14 and 15 arranged in circumferential succession around a shaft 16, much in the manner of the previous embodiment. However, in this case the pads are separately effective since each is supported by a resilient member 17 connected to a ring 18 at 19. Thus, the pads can be tilted by flexing of the members 17 and they are in fact normally tilted by respective springs 20, housed in and extending from the ring 18, so that the leading edges of the pads are further from the shaft that the trailing edges as in the previous embodiment.

Rotation of the shaft accordingly produces pressurized gas film regions which tend to support the shaft in a position of equilibrium as before. Additionally, movement of the shaft by vibration or shock will vary the pressures concerned such that the pads tilt from their normal positions in a sense to track the shaft movement and further reduce any risk of contact between the shaft and bearing. A fuller description of such bearings can be had from copending Pat. application No. 26,503/66, published on May 20, 1970 as British Pat. Spec. No. 1,192,354.

According to the invention, each pad is provided with a tubular portion 21 along its leading edge, in which tubes are located seismic mass rollers 22 with a small radial clearance and retained in their tubes by discs 23 or circlips. These masses serve, as discussed above, to damp out oscillation of the pads and afford stability against its occurrence.

Although the masses 22 are shown located along the leading edges of the pads, this is not essential and other locations are possible.

The invention is not limited to application in inclined or tilting pad bearings. For example, it may be applied also to improve the stability of externally pressurized and many types of self-acting journal bearings.

I claim:

1. A damped bearing assembly for a rotatable member, comprising:
    a rotatable member having a bearing surface therearound,
    a support for said rotatable member,
    at least one bearing means arranged around said rotatable member for limited movement radially of the axis of rotation of the rotatable member, said bearing means being positioned between said rotatable member and said support,
    a generally cylindrical cavity formed in said bearing means on an axis which is substantially parallel with the axis of rotation of the rotatable member, and
    a generally cylindrical seismic mass located in said cavity with a small radial clearance between the seismic mass and the cavity so that said seismic mass is free to move for limited radial distances within said cavity.

2. An assembly according to claim 1 wherein the bearing means is spaced from said rotatable member by a gas film and is resiliently supported from said support.

3. An assembly according to claim 1 wherein the bearing means houses a plurality of component seismic masses in the form of cylindrical rollers located in a plurality of said cylindrical cavities, each of which are parallel to the axis of rotation of said rotatable member.

4. An assembly according to claim 3 wherein said rollers are uniformly spaced in the bearing means.

5. An assembly according to claim 3 wherein the clearance between each roller and its associated cavity is of the order of 0.0001 to 0.0025 inch.

6. An assembly according to claim 1 wherein said mass is resiliently mounted from the support.

7. An assembly according to claim 1 wherein the bearing means comprises a plurality of bearing pads arranged in uniform succession around said rotatable member, each pad being spaced from said rotatable member with decreasing radial clearance from the leading edge to the trailing edge of the pad relative to the direction of rotation, and pad support means disposed remotely from said rotatable member and resiliently supported from said support for the rotatable member, said last-named support being a fixed member.

8. An assembly according to claim 7 wherein said pad support means is of generally unitary, cylindrical form, housing a plurality of component seismic masses each in the form of cylindrical rollers located in separate cylindrical bores parallel to the axis of rotation and spaced from the bores by small radial clearances.

9. An assembly according to claim 7 wherein said pad support means is of generally longitudinally split cylindrical form with one sectoral part per pad, each sectoral part being individually resiliently supported from said fixed member and housing like component seismic masses.

10. An assembly according to claim 9 wherein each of said sectoral parts is tiltably supported from said fixed member.

* * * * *